United States Patent [19]

Savey

[11] 4,243,761
[45] Jan. 6, 1981

[54] PANEL FORMED FROM A PHENOLIC RESIN AND A METHOD FOR ITS MANUFACTURE

[76] Inventor: Claude Savey, 21 Route Nationale, Bersee, Nord, France

[21] Appl. No.: 2,729

[22] Filed: Jan. 11, 1979

[30] Foreign Application Priority Data

Jan. 16, 1978 [FR] France ................................. 7801947

[51] Int. Cl.³ .............................................. B29D 27/04
[52] U.S. Cl. ..................................... 521/181; 264/45.3;
264/46.6; 264/101; 264/DIG. 2; 428/310;
521/120; 521/131
[58] Field of Search .................... 264/46.4, 46.5, 46.6,
264/DIG. 2, 45.3, 101; 521/181, 120, 172

[56] References Cited

U.S. PATENT DOCUMENTS 2,376,653  5/1945  Boyer ........................... 264/DIG. 2
4,130,614  12/1978  Saidla ............................ 264/46.4

FOREIGN PATENT DOCUMENTS 1090741  11/1967  United Kingdom ..................... 521/181

*Primary Examiner*—Philip Anderson
*Attorney, Agent, or Firm*—Robert E. Burns; Emmanuel J. Lobato; Bruce L. Adams

[57] ABSTRACT

A panel comprising fillers embedded in a closed cell expanded phenolic resin is made by making a mixture, which is initially fluid, of phenolic resin, a hardening agent, a surface active agent, a finely divided hydrophilic material and a porogenic agent, which has a boiling point above ambient temperature and below the polycondensation temperature of the mixture. This liquid mixture is mixed with fillers, for example balls or microspheres of glass or expanded material such as polystyrene. The resulting mixture is placed in a mould, only partially filling the mould, and heated progressively to a temperature in the neighborhood of the boiling point of the porogene agent, while evacuating the mould, and held at that temperature until the mixture has expanded to fill the mould. The temperature is then progressively increased to the polycondensation temperature to harden the expanded mixture.

13 Claims, 3 Drawing Figures

PANEL FORMED FROM A PHENOLIC RESIN AND A METHOD FOR ITS MANUFACTURE

FIELD OF INVENTION

The present invention relates to a panel based on polycondensable resin and a method for the manufacture of this panel.

The invention relates more particularly to the manufacture of panels from a phenolic resin comprising a filler consisting of balls of expanded polystyrene, or expanded clay, or microspheres, of glass, or a similar material.

Background of the Invention

These panels, obtained by mixing the filler with a liquid mixture comprising the phenolic resin, an agent for hardening this resin, and a porogenic agent, then polycondensing the mixture, have a certain number of drawbacks in their present method of manufacture, due to their structure and to the fact that their manufacture is inadequately controlled.

One of these drawbacks resides in that under the conditions in which the manufacture is presently carried out, for obtaining a phenolic resin with open cells, on the one hand the latter is subject to infiltrations in particular of water and on the other hand, burns easily owing to the presence of air which is trapped therein. In addition, this resin having open cells lacks cohesion.

It is possible to minimise these drawbacks by placing the panel obtained between facings of a suitable type, for example steel facings, but it is only possible to envisage facings defining a casing around the panel, which casing has inherent cohesion owing to the lack of cohesion of the panel itself. In particular, it is not possible to produce facings in the form of a layer of polymerisable resin integral with the panel over the entire surface area, this constraint limits the currently known use of panels based on phenolic resin.

Another drawback of these panels resides in their lack of homogeneity, fillers having a density less than the density of the resin tending to rise when the resin has not been completely polycondensed and in particular at the time of an expansion phase, whereas denser resin tends to drop. A cut made in a panel produced in the currently known manner reveals a much greater density of filler on the lower part of the panel than in its upper part, the result being great friarbility of the panel in its upper part. It is also apparent that the resin expands in a heterogeneous manner, expanding much more freely towards the top of the panel than at the bottom, which detracts further from the mechanical properties of the panel in its upper part.

Furthermore, difficulties are encountered in working industrially with filled phenolic resins with their currently known composition, owing to their short shelf life, i.e. the short period of time during which they can be used after preparation, considerably limits the quantity of resin which can be prepared and consequently used for a manufacture.

Description of Invention

The present invention makes it possible to remedy all these drawbacks, both by a wise choice of the composition of the polycondensable mixture used and owing to control of the conditions, in particular evolution of temperature during the manufacture.

By dissociating the expansion of the mixture and its polycondensation, i.e. its hardening, the invention makes it possible to cause a maximum expansion before the hardening, i.e. to ensure complete filling of the mould in which the manufacture takes place, before hardening of the mixture, which results in obtaining closed cells and an outer skin which is impermeable and has a homogeneous appearance. If one introduces into contact with the inner sides of this enclosure, a material intended to constitute a facing layer to obtain good anchoring of the facing layer and of the core of expanded phenolic resin in their adjacent areas the expanded phenolic resin core additionally providing a good cohesion owing to the closed cell structure obtained by the invention.

This dissociation of the expansion phase and of the hardening phase is obtained by a wise choice of the porogenic agent, selected so that its boiling point is lower than the polycondensation temperature of the mixture, but much higher than the ambient temperature, in order to prevent the beginning of an emulsion during mixing, which on the one hand would reduce the shelf life of the mixture and on the other hand would limit the facility for subsequent expansion of the mixture. The method of heating the mould after the introduction of the polycondensable mixture and of the fillers will be adapted in order to effectively achieve dissociation of the expansion phase of the resin and of the polycondensation phase in order to control the reaction and obtain a homogeneous material. According to the invention, heating is in fact carried out such that the temperature rises progressively to a temperature close to the boiling point of the porogenic agent, then this temperature is kept virtually constant for a sufficient period of time to bring about maximum expansion of the mixture, under high steam pressure of the porogenic agent, which sets on the interior of the mould by pushing forces in all directions in the region of each filler. The temperature is then increased once more progressively to the polycondensation temperature, in order to bring about this polycondensation when the expansion is maximum, in view of the limited volume of the mould in which it is carried out. The progress of this last rise in temperature permits the complete elimination of water vapour and formaldehyde, preferably under the joint action of the vacuum. This progressive and therefore more complete elimination will make it possible to obtain an improved surface appearance of panel.

There is added with the polycondensation mixture a divided hydrophilic material such as plaster which fixes around each piece of filler part of the water resulting from the polycondensation and the water contained in certain constituents of the mixture as a diluent, which permits limitation of the quantity of water reaching the panel surface and which is eliminated more completely by vacuum action.

It is to be noted that the quantity of water retained around each charge by the divided hydrophilic material distributed in the polycondensation mixture considerably improves the fire resistant qualities of the panel. Further the hydrophilic material used improves the mechanical resistance of the panel, especially as regards compression.

Moreover, by influencing the viscosity of the mixture, this material favours a homogenic covering of the fillers, that is to say the fixation of a maximum of the mixture on the fillers, in homogenic fashion, before there is effected the maximum expansion then polycondensation as described above.

To this end, the proportion of surface active agents in the mixture is increased in order to provide better adhesion of the resin to the fillers. The proportion of hardening agents will be reduced in order to decrease the effects of starting of the polycondensation phase at a temperature lower than or equal to the selected temperature of the stage. The essential purpose of these modifications in the proportions of the mixture with respect to the proportions used in known manner is to give the viscosity of this mixture before expansion and to maintain this viscosity during expansion, at a value which is sufficiently high in order that the adhesion to the fillers is sufficient and sufficiently moderate to prevent the agglomeration of an excessive-quantity of mixture around the fillers resulting in inadequate expansion for reasons of weight.

The proportion of divided hydrophilic material in the mixture must not be too high in order not to prevent expansion and not to fix too much water before polycondensation insofar as the water present in the mixture plays a diluting role for certain constituents thereof.

The advantage obtained by the presence of the divided hydrophilic material in the mixture results, whether one wishes it or not, is the covering of the panel with facing layers having a phenolic resin base.

Two embodiments of panel comprising generally a core of polycondensed expanded resin and a covering also of polycondensed resin, sometimes not expanded, are obtainable.

According to a first method called "contact moulding" used to produce a panel having a phenolic core covered with phenolic resin, the walls of a mould are coated with resin impregnated with reinforcing fibres. When gelling starts, there is placed in the mould the expansible mixture adapted to form the core, the mould is closed, expansion and polycondensation of the resin for constituting the core initiated and thereafter polycondensation of the resin forming the facing layer occurs.

This method has operational inconveniences namely in the condensation of water, acid and formaldehyde where one at least of the resins is a phenolic resin, which condensations make essential cleaning of the mould before its re-use. This results in long manufacturing times since it is necessary to emply a mould for up to five hours to produce a panel, largely due to this essential cleaning.

A second method consists in prefabricating the expanded core of the panel for example by moulding under vacuum. This core is then covered with fibres adapted to reinforce the facing layer which fibres are in the dry state, that is not impregnated with resin. A mould is then closed around the assembly and there is injected therein the resin to form the surface layer between the core and the mould by covering the reinforcing fibres.

This method has the inconvenience of two operations, namely the operation of manufacturing the core and the operation of producing the surface layer around the core. The anchoring of the surface layer is thus obtaining employing little energy.

These two methods have a common factor which is the preservation of the reinforcing fibres of the facing layer of a moulding by the resin constituting the core or by products resulting from the polycondensation of this resin.

It is essential that the fibres be dry when they are covered with the resin to form the facing layer since the presence of the resin forming the core in the region of the fibres would result in a different surface aspect of panel terminating in corresponding zones with generally a decrease in the mechanical resistance of the panels at these zones, and the presence of gaseous or liquid inclusions resulting from the presence of products of polycondensation of the resin forming the core among the fibres would give a porous surface with lessening in the mechanical properties of the panel surface.

According to the invention, the expanded core and its coating are formed in a single mould, the reinforcing fibres being present in the mould during expansion and polycondensation of the core without being as much impregnated by the mixture for forming the core or by the products of polycondensation.

Indeed, the composition of the mixture and the operational conditions indicated above would result in giving the core a closed cellular structure with an impermeable skin not penetrable by woven or nonwoven fibres and forming a veneer when expanded. The presence of a hydrophilic material in the mixture permits, on the one hand, retention therein of part of the water found there at the start or produced by the polycondensation. The formation of a vacuum in the mould eliminates the remainder of this water and the different gases as polycondensation progresses. In these conditions the resin for forming the surface layer is injected into the mould at the end of the expansion phase of the core between the core of the mould wall and wholly covers the reinforcement thus giving a homogenic covering. The covering and core resins are then polycondensed together which ensures an effective anchoring of the covering layer on the core.

The process according to the invention is consequently characterised in that the fillers are mixed with a fluid mixture comprising at least a phenolic resin, a hardening agent, a tension-active agent and a porogenic agent selected such that it has a boiling temperature between the ambient temperature of mixing and the polycondensation temperature of the mixture, and a divided hydrophilic material.

Another feature of the process is that, after having placed the assembly within a mould in a quantity permitting eventual expansion, the temperature of the mixture is progressively raised to a temperature in the region of the boiling temperature of the porogenic agent, then to maintain the temperature constant for a time sufficient to cause maximum expansion of the mixture, then to raise again progressively the mixture temperature to cause polycondensation in the maximum expanded condition.

According to another feature, the composition of the mixture is such that it is in a gel state until it reaches the temperature in the region of the boiling temperature of the porogenic agent to give to this mixture a viscosity such that it disposes a maximum quantity around the fillers before and during the expansion.

The panel according to the invention comprises a phenolic resin covering the fillers and is characterised in that the phenolic resin is an expanding one with a closed cell structure and in that it includes a divided hydrophilic material.

DESCRIPTION OF DRAWINGS

The present invention will now be described by way of example with reference to the accompanying drawing in which.

The same reference numerals have been used in these three figures to designate the various constituents of the finished panel (FIG. 3) and these various constituents as they exist during the various stages of manufacture of the panel (FIGS. 1 and 2).

DESCRIPTION OF PREFERRED EMBODIMENTS

Figure 3:
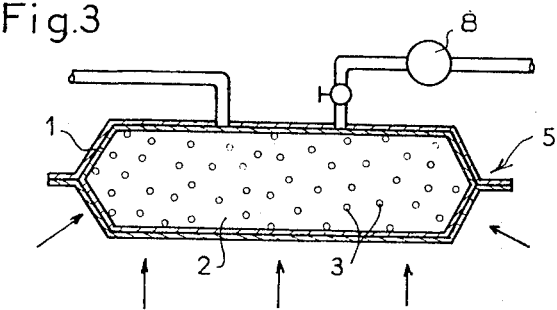

In its embodiment illustrated in FIG. 3, the panel according to the invention has an outer covering layer 1 of polycondensed phenolic resin, covering a layer of glass fibre fabric or other analogous reinforcement, integral with the entire surface area of the core produced from an expanded phenolic resin 2 having closed cells, coating the fillers 3 and for example balls or microspheres of glass or an expanded material such as expanded polystyrene, expanded clay etc.

The fillers 3 are coated in the resin 2 including the side of the core in contact with the covering layer 1, where the resin 2 forms an impermeable skin.

According to one characteristic of the invention, the resin 2 includes a divided or powdered hydrophilic material such as plaster, gypsum or other analogous material.

Figure 1:
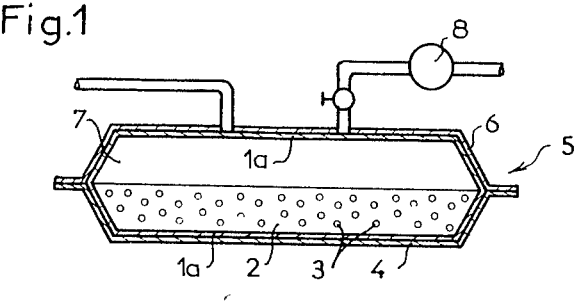
FIGS. 1 to 3 show in a vertical cross-section perpendicular to the general horizontal plane of a mould three successive stages in the fabrication of a panel according to the invention by moulding.
Figure 2:
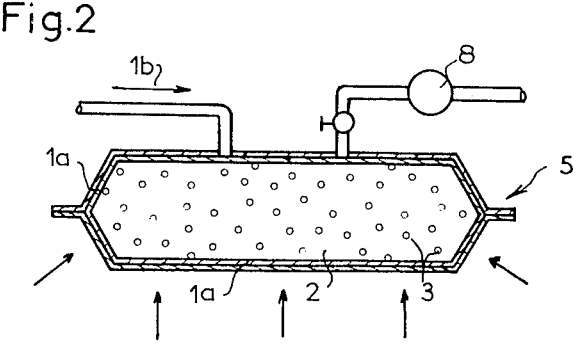

To produce such a panel, an expansible and polycondensible mixture is produced, initially fluid, intended to form the resin 2, which mixture is also shown in FIGS. 1 and 2 indicated by reference 2.

This mixture comprises at least one phenolic resin, a hardening agent, a surface active agent, a porogenic agent and the powdered hydrophilic material.

As a non-limiting example, good results have been obtained by using a mixture comprising a hardening agent constituted by sulphuric acid to which alcohol and water have been added, a surface active agent constituted by silicon oil, a porogenic agent constituted by a trichlorotrifluoroethane, and plaster using of the order of 30 to 60% by weight of plaster in relation to the weight of resin in the mixture.

This proportion of the order of 50% is given by way of non-limiting example and is sufficient so that the plaster can retain water and so that the plaster does not fix too great a quantity of the water diluting the hardening agent before polycondensation, and does not constitute an impediment to the later expansion of the mixture.

The trichlorotrifluoroethane has a boiling point of approximately 47° C., which is an intermediate temperature between ambient temperature at the time of mixing and the polycondensation temperature of the mixture, which is of the order of 60° C. at 0.6 atmospheres, this choice being according to one of the aims of the invention, which is to allow maximum expansion before polycondensation by controlling the rise in temperature of the mixture when it is placed in the mould.

After production of the mixture, the fillers are added and the whole is mixed in order to distribute the fillers better.

The complete mixture is then placed in one of the halves 4 of a mould. Beforehand, if it is desired to obtain a panel comprising on its exterior a covering 1, reinforced with fibres, for example, a cloth covering, the surface of the mould is covered with this reinforcing material designated by reference 1a in FIGS. 1 and 2.

The mould 5 is then sealed hermetically by folding the half 6, in the case above covered interiorly with a layer of fibres, over on to the half 4 and then heating the space 7 remaining free above. The mixture 2-3 inside the mould 5 owing to the fact that only the half 4 was initially filled with mixture 2-3, is connected to a vacuum pump 8 which establishes a vacuum before and during polycondensation following upon the heating which will be described later. The reduced pressure may remain slight during the stage of the rise in temperature and the expansion stage, but will be increased during the polycondensation stage in order to eliminate any vapours.

According to the invention, this heating takes place in three stages the first of which, lasting for 30 minutes for example, progressively increases the temperature of the mould and its contents from the ambient temperature to a temperature of the order of 40° C. for example, i.e. a temperature close to the boiling point of the porogenic agent used. The temperature is then maintained at this value, for example of 40° C., for 30 minutes for example, during which stage the mixture expands under the high pressure of vapours coming from the porogenic product. At the end of this expansion stage, the temperature is then increased progressively from 40° C. to 60° C., at which point polycondensation occurs, the latter heating lasting for approximately 120 minutes for example.

A polycondensation temperature of the order of 60° C. makes it possible to use expanded polystyrene balls as fillers 3, which should not be heated to a temperature higher than 80° C.

In the illustrated example where it is desired to obtain a panel clad with a layer 1 of phenolic resin reinforced with fibres 1a, there is introduced into the mould, at the end of the expansion stage, that is to say at the end of the maintainance of the contents of the mould at a constant temperature before the second rise in temperature, a phenolic resin 1b intended to cover the fibres 1a.

This operation is shown schematically in FIG. 2 by an arrow. It culminates in the introduction, between the maximum expanded mixture 2 and the surface of the mould, that is to say among the fibres 1a, a phenolic resin of ordinary composition but adapted to polycondense in phase with the mixture 2. Thus, when the second rise in temperature of the mould contents is produced, the resin 1b and the mixture 2 polycondense simultaneously which ensures a good anchoring of the covering layer 1 obtained over the core formed by the expanded and polycondensed mixture 2-3. This anchoring is all the better when the maximum expansion of the mixture 2 obtained before the hardening fills up the whole interior volume of the mould with expanded material, which is applied under pressure against the fibre layer 1a then against this fibre layer covered by the resin 1b that is applied against the surface of the mould at the end of the expansion stage and during the hardening.

Naturally, the composition indicated above and the operating conditions, bound to this composition, are given purely by way of example and can be replaced by a number of variations without departing from the scope of the invention.

What is claimed is:

1. A process of making a panel which comprises:
    forming a fluid mixture of phenolic resin, a hardening agent, a surface active agent, a finely divided hydrophilic material and a volatile liquid pore forming agent having a boiling point above ambient temperature during mixing and below the polycondensation temperature of said mixture, uniformly mixing said mixture with solid fillers in particulate form, partially filling a mould with said fluid mixture with said fillers therein and closing said mould, progressively raising the temperature of said mixture to a first temperature in the vicinity of the boiling point of said pore forming agent and maintaining said mixture at said temperature to produce maximum expansion of said mixture to fill said mould, and thereafter progressively raising the temperature of said mixture to a second temperature equal to the polycondensation temperature of said mixture to effect polycondensation of said mixture.

2. A process according to claim 1, in which said mould is evacuated during heating before and during polycondensation of said mixture.

3. A process according to claim 1, in which the walls of said mould are covered with a layer of fibrous reinforcing material prior to the introduction of said fillers and mixture into said mould.

4. A process according to claim 1, in which said pore forming agent is a trichlorotrifluroethane having a boiling point of about 47° C.

5. A process according to claim 4, in which said mixture has a polycondensation temperature of about 60° C.

6. A process according to claim 4, in which first temperature to which said mixture is raised is about 40° C.

7. A process according to claim 1, in which said fillers comprise small balls of glass, expanded polystyrene or expanded clay.

8. A process according to claim 1, in which said hydrophilic material is selected from the group consisting of plaster and gypsum.

9. A process according to claim 1, in which the proportion of said hydrophilic material is between 30% to 60% by weight in relation to the weight of resin in the material.

10. A process according to claim 1, in which the composition of the mixture exists is a gel state before and during expansion in order to have such viscosity that a maximum quantity of the mixture gathers around the fillers.

11. A panel made by the method defined in claim 1.
12. A panel made by the method defined in claim 5.
13. A panel made by the method defined in claim 7.

* * * * *